United States Patent
Anderson

[15] 3,674,188
[45] July 4, 1972

[54] FISH AND GAME RECEPTACLE
[72] Inventor: Charles C. Anderson, Rte. #1, Quinton, Okla. 74561
[22] Filed: April 14, 1971
[21] Appl. No.: 134,002

[52] U.S. Cl. .......................... 224/5 G, 43/55, 150/1
[51] Int. Cl. ............................................. A45f 3/02
[58] Field of Search .......... 224/5, 5 G, 7 B; 150/1, 28 R; 43/55

[56] References Cited
UNITED STATES PATENTS
278,947  6/1883  Harden ......................... 150/28 R
2,555,128  5/1951  Gutshall .......................... 43/55 X

*Primary Examiner*—Gerald M. Forlenza
*Attorney*—Cushman, Darby & Cushman

[57] ABSTRACT

A fish and game receptacle including an outer water-pervious sack, such as a burlap sack, and, within the sack, a water-impervious liner bag, such as a plastic bag, in which approximately the bottom half portion of the liner bag on one side has perforations to permit water or blood to drain from the receptacle while minimizing dehydration of the contents of the receptacle.

12 Claims, 2 Drawing Figures

PATENTED JUL 4 1972
3,674,188
Fig. 1.
Fig. 2.
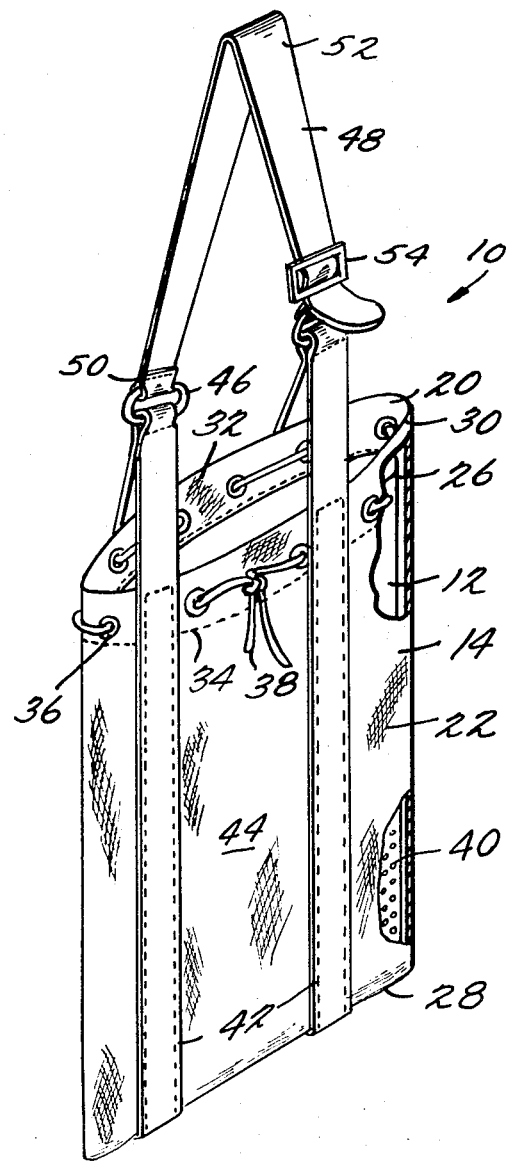
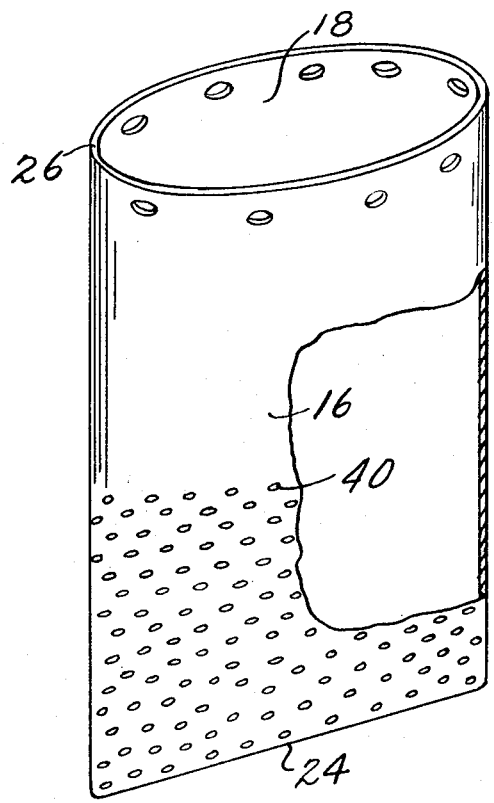
INVENTOR
CHARLES C. ANDERSON
BY Cushman, Darby & Cushman
ATTORNEYS

FISH AND GAME RECEPTACLE

BACKGROUND OF THE INVENTION

This invention relates to a receptacle, and more particularly to a fish and game sack.

The use of moisture proof bags for storing live fish is well known in the art. For instance, the patent to Bodell, U.S. Pat. No. 3,168,887 of Feb. 9, 1965, discloses a rubber film container within a mesh sack. This container is air tight and water tight. If dead fish of other game is placed in a water tight container, it becomes slimy and soft, a condition detrimental to the eatability of the game or fish. On the other hand, if the game or fish is carried in an open mesh sack, it is apt to become dehydrated.

BRIEF SUMMARY OF THE INVENTION

This receptacle overcomes the defects of the prior art and provides a suitable receptacle for carrying game or fish while preventing the same from becoming slimy and soft. At the same time the receptacle reduces the amount of evaporation, thereby minimizing dehydration of the game or fish and consequential spoiling of the same. This receptacle consists of an outer water-pervious sack, such as a burlap sack, with a water-impervious liner bag received within the sack. The liner bag has perforations to permit water or blood to drain out of the bag. The bag is thus neither air tight nor water tight. The amount of drainoff can be regulated by either placing the perforations up or down. Besides serving as a pack sack, the receptacle is excellent for icing down game since it permits drainage of water as the ice gradually melts. Finally, the perforated receptacle can be employed for keeping fish alive when used on a bank, in a boat, or while wading. Suitable support straps are provided for ease of carrying and for supporting the sack and liner bag.

BRIEF DESCRIPTION OF THE DRAWINGS

FIG. 1 is a front perspective view of the receptacle; and
FIG. 2 is a front perspective view of the plastic liner bag.

DETAILED DESCRIPTION OF THE PREFERRED EMBODIMENT

There is shown in FIG. 1 a receptacle 10 comprising a stretchable, relatively weak, water-impervious liner bag 12 and a substantially inelastic, relatively strong, water-pervious sack 14. The liner bag 12 could be made of a synthetic plastic resin, such as polyethylene having, in one embodiment, a thickness 0.010 inch, or any other suitable synthetic plastic material. In fact, other stretchable, water-impervious natural plastic materials, such as rubber, could be used. The outer sack 14 is made of substantially inelastic, relatively strong material, such as burlap, having a weight, in one embodiment, of 14 oz. per sq. yd.

As illustrated, the receptacle naturally folds into a shape in which both the liner bag and the sack are shown having two sides 16 and 18 and 20 and 22, respectively. The liner bag has a closed end 24 and an open end 26. Likewise, the sack has a closed end 28 and an open end 30.

The liner bag is received within the sack so that the open end 26 of the liner bag faces in the same direction as the open end 30 of the sack. As illustrated, the sack has greater depth than the liner bag so that the upper, end portion 32 of the sack can be inwardly doubled over to form the sack flap. The upper, open end 26 of the liner bag is received between the sack 14 and the sack flap 32.

As illustrated, stitching 34 secures the two portions of the sack together with the liner therebetween. A plurality of grommets 36 extend around the circumference of the sack and serve to support the liner between the sack and the sack flap. These grommets receive a draw string or closing cord 38 for closing the sack.

In order to permit drainage of water and blood from the receptacle while at the same time minimizing dehydration, a plurality of holes or perforations 40 are provided in one side 16 of the liner. As illustrated in one embodiment, these holes cover the bottom half of one side of the sack. Perforations 40 are only placed on one side of the liner bag in order to keep drainage away from the pant leg of the fisherman or hunter. The rate of evaporation can be controlled to a certain extent by the number of holes inserted in the liner bag, and, when used, by placing the receptacle with the perforations up or down. In one embodiment, ⅛-inch holes on 1-inch centers were cut through the liner bag.

Support straps 42 are stitched to the exterior surface 44 of the sack and extend at least from the open end 30 of the sack on one side 20 to the open end 30 of the sack on the other side 22. As illustrated, the support straps extend above the opening of the sack and are fastened to floating rings 46. A shoulder strap 48 is attached at its free ends 50 to the floating rings. The shoulder strap may be widened at its central portion 52 where it goes over the shoulder for more carrying comfort. A buckle 54 is provided for adjusting the length of the strap. The support strap and shoulder strap could be made, for instance, of doubled burlap or cotton ducking, or, for that matter, any other suitable material.

While the preferred form of the invention has been illustrated in the drawings and discussed above it should be adequately clear that considerable modification may be made thereto without departing from the principles of the invention. Therefore, the foregoing should be considered in an illustrative sense rather than a limiting sense, and accordingly, the extent of this invention should be limited only by the spirit and scope of the claims appended hereto.

What is claimed is:

1. A fish and game receptacle comprising:
    a stretchable, relatively weak, water-impervious liner bag having an open end and at least two sides;
    a substantially inelastic, relatively strong, water-pervious sack having an open end, the liner bag being inserted within the sack with the open ends of the bag and the sack facing in the same direction;
    attaching means for securing the liner bag adjacent its open end to the sack; and
    one of the sides of the liner bag having a plurality of perforations to permit water or blood to drain from the liner bag.

2. The receptacle defined in claim 1 wherein the perforations are located in the bottom half portion of one side of the liner bag.

3. The receptacle defined in claim 1 wherein the attaching means comprises stitching.

4. The receptacle defined in claim 1 wherein the attaching means comprises a plurality of grommets extending through the sack and liner adjacent their open ends and cord means extending through the grommets for drawing the sack and liner bag closed.

5. The receptacle defined in claim 1 additionally comprising a shoulder strap secured at each free end to opposite sides of the sack.

6. The receptacle defined in claim 5 additionally comprising support strap means secured to the exterior surface of the sack and extending from the open end of the sack on one side to the open end of the sack on the other side, the shoulder strap being secured to the support strap.

7. The receptacle defined in claim 1 wherein the sack is made of burlap.

8. The receptacle defined in claim 1 wherein the liner bag is made of a plastic resin.

9. The receptacle defined in claim 1 wherein additionally a pair of support straps, a pair of floating rings, each support strap being secured to one of the floating rings above the open end of the sack and each support strap being secured to two sides of the sack and extending under the bottom of the sack, and a shoulder strap secured at one end to one floating ring above the open end of the sack and at the other end to the other floating ring.

10. The receptacle defined in claim 1 wherein the upper end portion of the sack is inwardly doubled over the free open end of the liner bag, the inwardly doubled-over portion of the sack being the sack flap, and including stitching means for securing the liner bag between the sack and the sack flap.

11. The receptacle defined in claim 10 additionally including a plurality of grommets defining holes extending through the sack, liner bag, and sack flap; and cord means extending through the grommets for drawing the sack and liner bag closed.

12. A fish and game receptacle comprising:
a plastic, water-impervious liner bag having an open end and at least two sides, one of the sides of the liner bag having a plurality of perforations through the bottom portion of the side, the top portion of the perforated side being free of perforations;
a substantially inelastic, water-pervious sack having an open end and at least two sides, the liner bag being inserted within the sack so that the open ends of the liner bag and sack are adjacent each other and facing in the same direction, the liner bag being secured to sack adjacent the open end of the liner bag;
means secured to the sack adjacent the open end of the sack for closing the open end of the sack; and
strap means having opposite ends, each end being operatively secured to one side of the sack for providing a handle or shoulder strap for carrying the receptacle.

* * * * *